(12) United States Patent
Botton

(10) Patent No.: US 10,432,071 B2
(45) Date of Patent: Oct. 1, 2019

(54) MANUFACTURING PROCESS FOR THE STATOR AND/OR ROTOR WINDINGS OF AN ELECTRIC MACHINE

(71) Applicant: SIPRO S.r.L., Lentate sul Seveso (MB) (IT)

(72) Inventor: Giulio Botton, Lentate sul Seveso (IT)

(73) Assignee: SIPRO S.R.L., Lentate sul Seveso (MB) (IT)

( * ) Notice: Subject to any disclaimer, the term of this patent is extended or adjusted under 35 U.S.C. 154(b) by 302 days.

(21) Appl. No.: 15/523,870

(22) PCT Filed: Oct. 30, 2015

(86) PCT No.: PCT/EP2015/002180
§ 371 (c)(1),
(2) Date: May 2, 2017

(87) PCT Pub. No.: WO2016/070979
PCT Pub. Date: May 12, 2016

(65) Prior Publication Data
US 2017/0317566 A1 Nov. 2, 2017

(30) Foreign Application Priority Data
Nov. 5, 2014 (IT) .............................. MI2014A1897

(51) Int. Cl.
*H02K 15/085* (2006.01)
*H02K 15/09* (2006.01)

(52) U.S. Cl.
CPC ........... *H02K 15/085* (2013.01); *H02K 15/09* (2013.01)

(58) Field of Classification Search
CPC ............................ H02K 15/085; H02K 15/09
See application file for complete search history.

(56) References Cited

U.S. PATENT DOCUMENTS 2,723,804 A 11/1955 Loring et al.
3,579,818 A * 5/1971 Arnold ................. H02K 15/068
29/56.5

(Continued)

FOREIGN PATENT DOCUMENTS

GB 1427176 A 3/1976

*Primary Examiner* — Carl J Arbes
(74) *Attorney, Agent, or Firm* — King & Schickli, PLLC

(57) ABSTRACT

The process utilizes a shaft (2) supporting the stator (1) and/or the rotor, respectively, and capable of rotating around its axis, a first (3) and a second (3') working station allocated on an opposite position on the sides of the stator and/or the rotor, respectively, next to the outlet area of the lateral mouth of a cavity. Said stations have carrying devices (4, 4') for the leading wire (f), clamps (5, 5') capable of grasping and moving the tip of the wire (f), and sensors (6, 6') for detecting the arrival of the extremity of the wire (f). The tip of the wire is at first introduced, by the clamp (5) of one station, inside the nearby carrier (4) and passes into the nearby cavity, and then exits until it is detected by the sensor (6') of the other station, whereupon the tip of the wire is grasped by the other clamp (5') and reintroduced into the second carrier (4'), as soon as the wire has exhausted its run inside the first cavity and the supporting shaft has, after rotating, positioned the subsequent cavity opposite the second carrier.

7 Claims, 4 Drawing Sheets

(56) References Cited

U.S. PATENT DOCUMENTS

Figure 6:
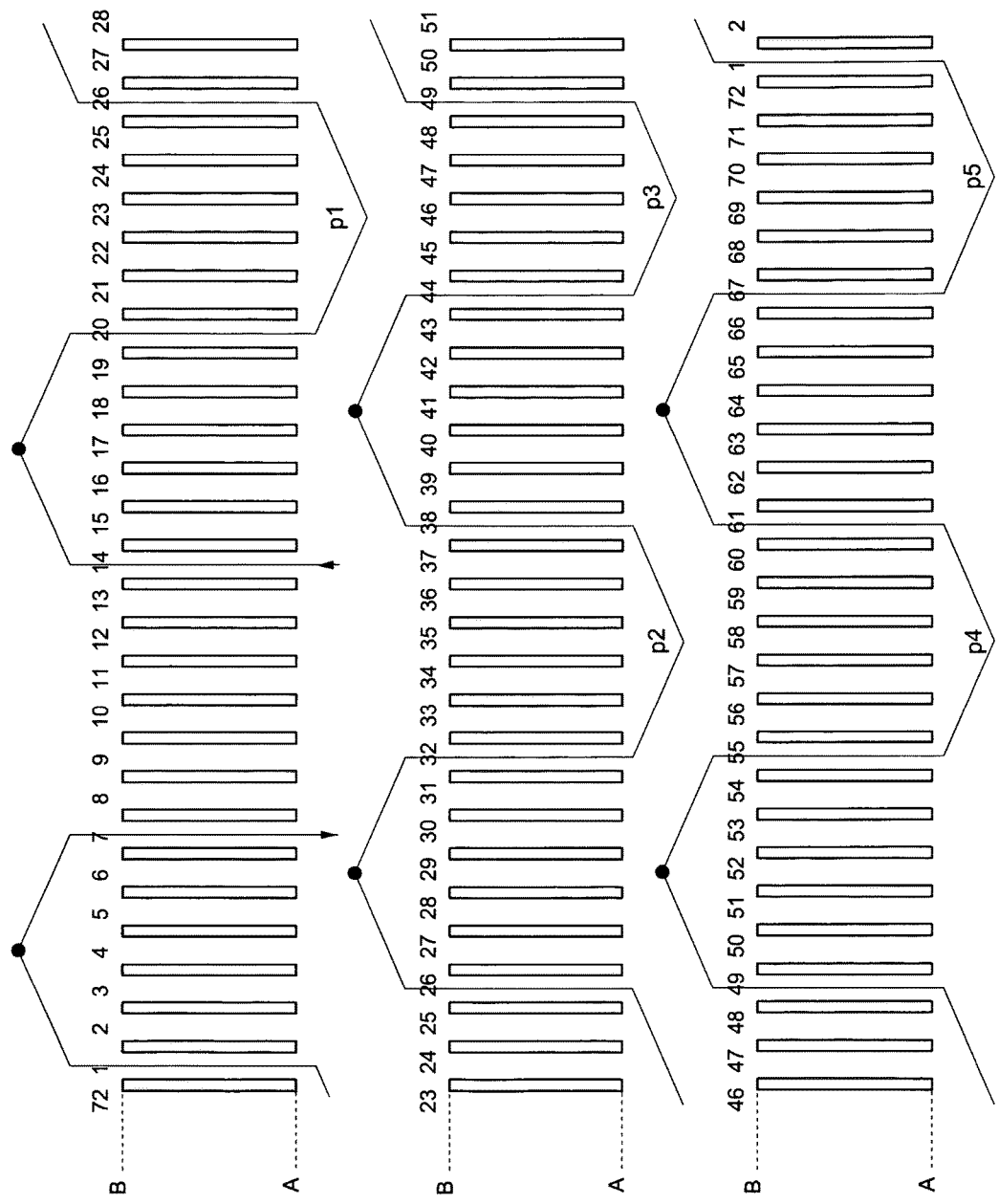
Figure 7:
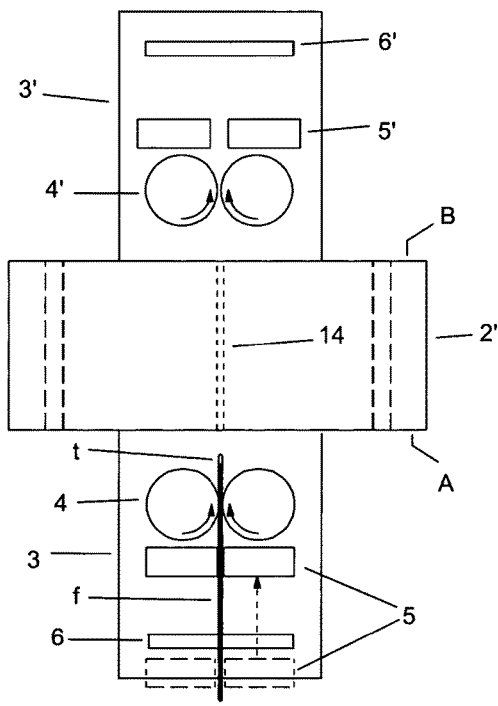
Figure 8:
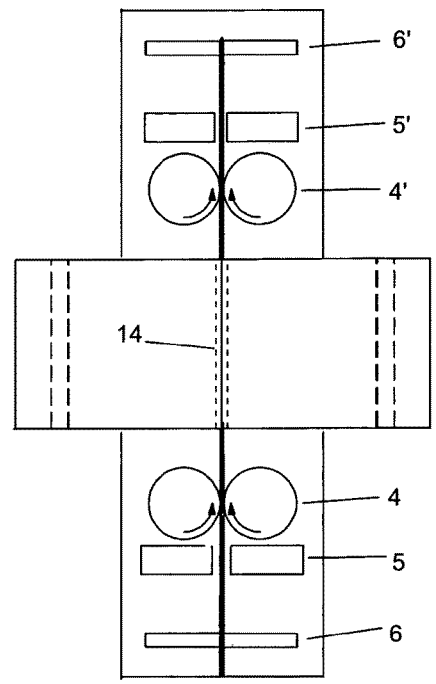
Figure 9:
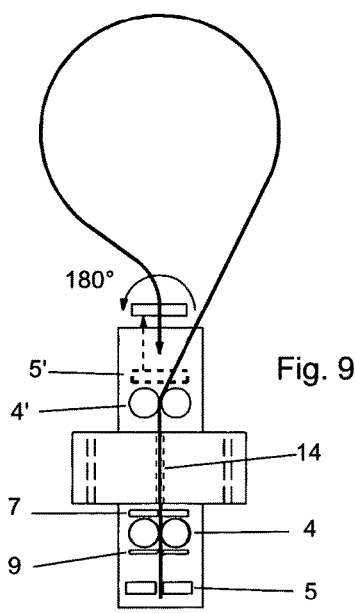
Figure 10:
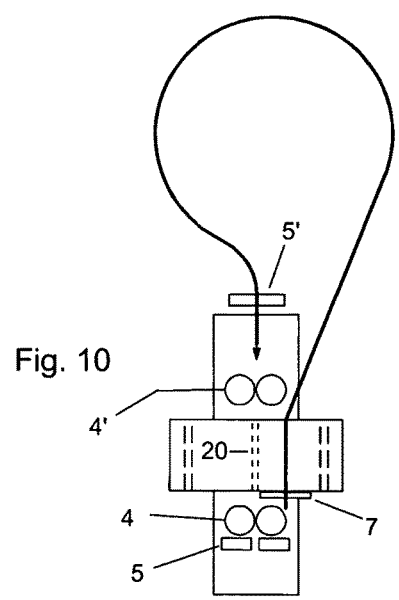
Figure 11:
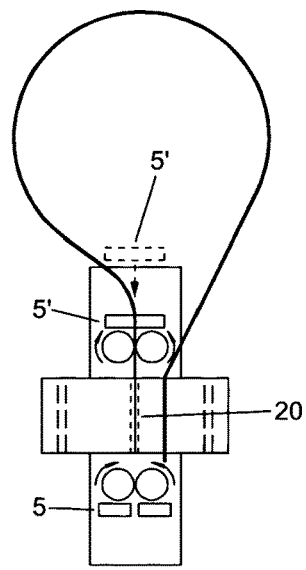
Figure 12:
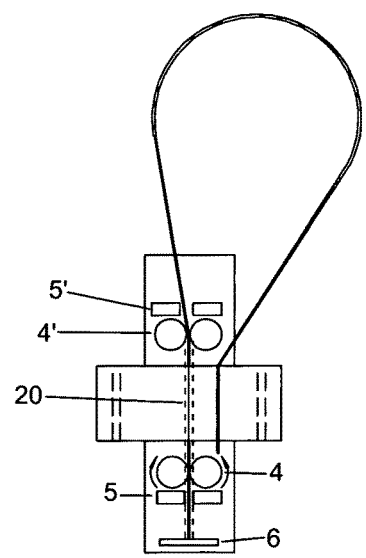

| | | | | |
|---|---|---|---|---|
| 3,909,902 A | * | 10/1975 | Peters | H02K 15/10 29/564.6 |
| 3,974,553 A | * | 8/1976 | Reiger, Jr. | B23P 23/00 29/38 C |
| 4,026,009 A | * | 5/1977 | Kindig | H02K 15/10 29/235 |
| 4,186,478 A | * | 2/1980 | Hamane | H02K 15/068 29/564.1 |
| 4,216,571 A | * | 8/1980 | Miller | H02K 3/38 29/596 |
| 4,349,956 A | * | 9/1982 | Koenig | H02K 15/105 29/596 |
| 4,449,289 A | * | 5/1984 | Kindig | H02K 15/10 29/596 |
| 4,557,042 A | * | 12/1985 | Kindig | H02K 15/10 29/734 |
| 2008/0017746 A1 | | 1/2008 | Jones et al. | |

\* cited by examiner

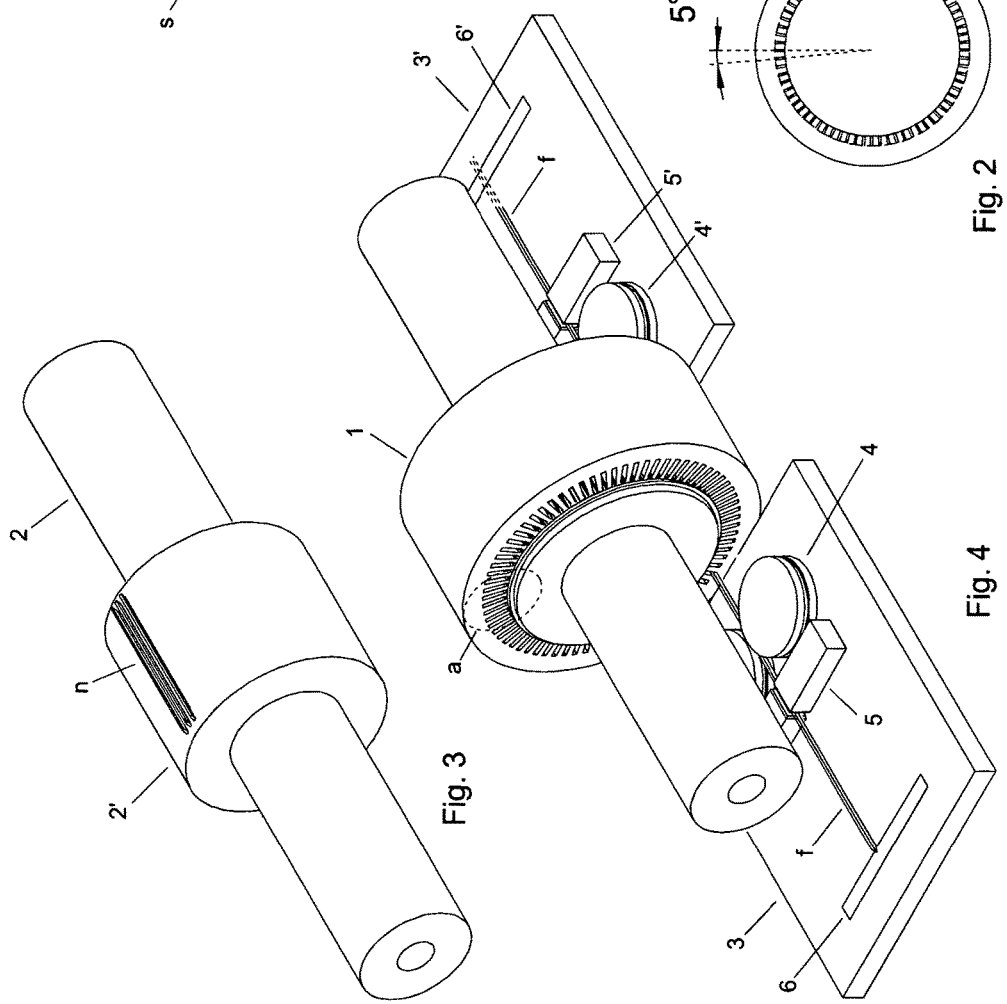

MANUFACTURING PROCESS FOR THE STATOR AND/OR ROTOR WINDINGS OF AN ELECTRIC MACHINE

FIELD OF THE INVENTION

The object of the present invention is a manufacturing process for the stator and/or rotor windings of an electric motor, which is particularly useful for the forming of stator windings of miniaturized high performance motors.

BACKGROUND OF THE INVENTION

At present a method used for the forming of stator windings of miniaturized high performance motors is the so-called "hairpin" method. This is a method in which the winding is realized by using a series of hairpin-shaped conductors introduced into the cavities of the stator in a certain order and with the legs of each hairpin introduced into separate cavities starting from one side of the stator and then bent and welded on the opposite side.

The manufacturing process according to the present invention is, while of a general applicative nature, particularly useful for the realizing of windings heretofore manufactured by the "hairpin" method, as it highly simplifies the process, while lending itself to a high degree of automation and substantially reducing the number of terminals to be welded, and the relative operations of peeling, welding, subsequent insulating, etc.

For this purpose, the process for the manufacturing of the stator and/or rotor windings of an electric motor according to the present invention is characterized as indicated in claim 1 below.

BRIEF DESCRIPTION OF THE DRAWING FIGURES

Figure 16:
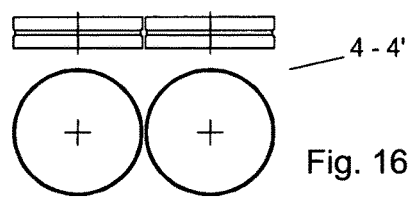
Figure 17:
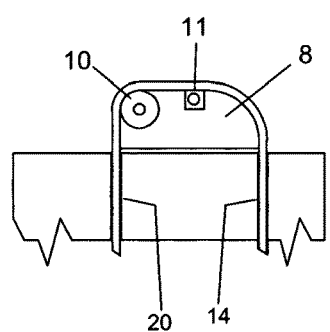

The process, together with its preferred realization forms outlined in the subordinate claims, will be better understood from the description that follows, pertaining to realization forms of an exemplifying and non-limiting character, with reference to the attached drawings whose figures schematically show:

FIG. 1: a prospective view of a stator with 72 cavities;
FIG. 2: a frontal view of the same stator;
FIG. 3: a prospective view of a supporting shaft of the stator in FIG. 1, according to the present invention;
FIG. 4: a prospective view of the shaft of FIG. 3, with the stator of FIG. 1 mounted thereon;
FIG. 5: an enlarged view of the portion indicated by "a" in FIG. 3;
FIG. 6: a partial stator winding layout, as realized by the "hairpin" method in a stator with 72 cavities;
FIGS. 7-15: phases of a process according to the invention, utilized for the realization of a partial winding shown in FIG. 6;
FIG. 16: frontal and sectional views of the realization examples of the carriers (4 and 4') shown in the FIGS. 7-15;
FIG. 17: a realization example of the component 8 shown in the FIGS. 13-15.

DETAILED DESCRIPTION OF THE REALIZATION EXAMPLES SHOWN IN THE PREVIOUS FIGURES

FIG. 1 is a schematic representation of a stator fitted with 72 cavities, each of which is angularly spaced out from the neighboring cavities by an angle of 5° as shown in the frontal view of FIG. 2 and extending from one side of the stator to the other (as the cavity represented for exemplifying purposes by a dashed line and designated by "c"), where each cavity has a first lateral mouth on one side (A) of the stator, a second lateral mouth on the opposite side (B), and an internal mouth on the cylindrical internal surface of the stator.

FIG. 3 is a representation of a shaft (designated by 2) destined to function, at its expanded cylindrical portion 2', as a support for the stator 1, being stator and shaft axes coinciding. The portion 2' is at its surface preferably fitted with 72 ribs (for exemplifying purposes, the figure only shows three, designated by "n", destined to be introduced into the internal mouth of each cavity, as better shown in FIG. 5.

FIG. 4 shows the stator 1 mounted on the shaft 2, which can be rotated around its axis, being held by supports with roller bearings, not shown in the figure.

The various parts in the figure show:
3, 3': a first and a second working station allocated on an opposite position at the sides of the stator, respectively, next to the outlet areas of one of the mentioned first and second lateral mouths, respectively,
4, 4': a first and a second carrying device, allocated on the first and second working station, respectively, utilized for the sliding and dragging of the wire f destined to form the windings in the opposite cavity, at the moment processed,
5, 5': a first and a second clamp, provided on the first and second working station, respectively, capable of grasping and moving the tip of the wire f of the winding under processing,
6, 6': a first and a second sensor, provided on the first and second working station, respectively, capable of detecting the arrival of the extremity of the wire f after it has crossed the cavity under processing.

FIG. 5 represents an enlarged frontal view of the portion indicated by "a" in FIG. 4. It evidences the presence of a fillet "j" that runs circularly along the internal mouth of the cavities, whose purpose is to prevent the insulating sheet normally present on the walls of the cavities from falling out while introducing the wire.

The figure also evidences the presence of six conductors in each cavity. The internal portion of the dashed line shows the appearance of the lateral mouth of the cavities behind the fillet "J", and evidences in particular how the ribs "n" are introduced inside the internal mouth of the cavities.

FIG. 6 shows a partial stator winding as realized by an "hairpin" method in a stator with 72 cavities.

The figure shows in particular the 5 hairpins p1, p2, p3, p4, p5, whose legs are introduced into the pairs of cavities 20-26, 32-38,44-49, 55-61, 67-1, respectively, while each enters from the side A of each cavity and exits from the side B, where it laterally welds onto the neighboring hairpins, except for the hairpins p1 and p5 which are connected to the entrance and exit conductors, respectively (cavities 14, 7).

The FIGS. 7-15 show how to utilize the process, according to the invention, for realizing a partial stator winding similar to that of FIG. 6.

In fact, in this case the process according to the invention provides the following phases:
1. Positioning of the shaft 2 so as to move the lateral mouths of the first cavity (14), of the series of cavities 14, 20, 26, 32, 38, 44, 49, 55, 61, 67, 1, 7 to a position opposite the mentioned carriers 4, 4' (See FIG. 7, which shows only the portion 2' of the shaft 2 for clarity).

2. Introducing the tip of the wire, by using the mentioned first clamp 5, into the first carrier 4 and subsequently introducing the tip, by an action of the same carrier, into the first lateral mouth of the cavity 14 so as to slide it inside the cavity and exit from the second lateral mouth, until the wire passes through the second carrier 4' and is detected by the second sensor 6' (FIG. 8).
3. Actuating the second clamp 5' so that after grasping the wire near its tip, the same shifts a certain distance in the advancing direction of the wire and rotates its tip until turning it into an opposite direction, and at the same time:
4. Continuing the exit of the wire from the second lateral mouth, until the length of the exited wire has reached a measure adequate to complete the passing of the wire, in the subsequent phases, through the mentioned series of cavities (FIG. 9).
5. Stopping the dragging action of the first (4) and the second (4') carrier and actuating a third clamp (7) in the first working station that blocks the extremity of the wire near the mentioned first lateral mouth of the first cavity (cavity 14) of the mentioned series (FIG. 9).
6. Disengaging the wire from the first and the second carrier and rotating the shaft (2) together with the mentioned third clamp (7), until the lateral mouths of the second cavity of the mentioned series (cavity 20) are brought to a position opposite the mentioned carriers (FIG. 10).
7. Specularly repeating the previous processing phase 2 (See FIGS. 11 and 12) and phase 3 (See FIG. 13), while interpreting to substitute the terms "first clamp (5)", "first carrier (4)", "first mouth of the first cavity", "second mouth", "second carrier (4')" and "second sensor (6')" by the terms "second clamp (5')", "second carrier (4')", "second mouth of the second cavity", "first mouth", "first carrier (4')", and "first sensor (6)", respectively.
8. Continuing the exit of the wire from the first lateral mouth of the second cavity (cavity 20) of the mentioned series, until the tread is disengaged from the second carrier 4' and the length of the wire connecting the second lateral mouth of the first cavity (cavity 14) of the mentioned series with the second lateral mouth of the second cavity (cavity 20) has been reduced to a certain value ("v") slightly exceeding the distance between the internal mouths of the two cavities (FIG. 3).
9. Disengaging the wire from the first carrier 4 and rotating the shaft (2) until the lateral mouths of the third cavity of the previous series (cavity 26) are brought to a position opposite the mentioned carriers (FIG. 14).
10. Repeating, mutatis mutandis, the previous operations from 7 to 9 for all the remaining cavities of the previous series, until the tip of the wire exits from the first lateral mouth of the last cavity (7) of the series (FIG. 15).

FIG. 16 shows the frontal and sectional views of the realization example of the carriers (4 and 4') shown in the FIGS. 7-15. These are in fact two rollers rotating in an opposite sense, whose cylindrical surfaces are fitted with a central groove that is better capable of holding the conducting wire during its dragging motion.

Figure 13:
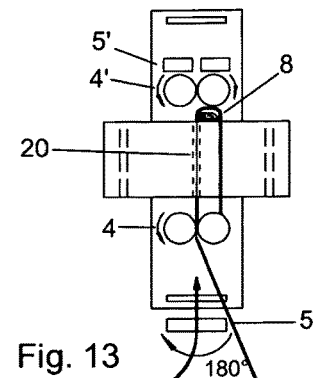
Figure 14:
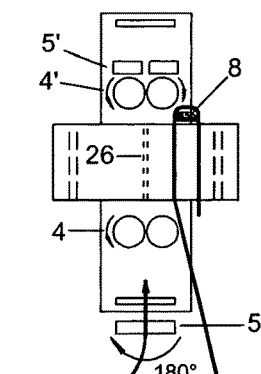
Figure 15:
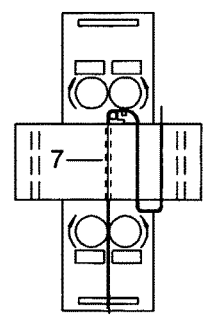

FIG. 17 shows a realization example of the component indicated by 8 in the FIGS. 13-15. This is a device equipped with a proximity sensor 11 and a roller 10 capable of easing the introduction of the wire into the cavity during the terminal phase of introducing the wire, and which is introduced between the lateral surface of the stator and the wire in order to detect the moment when the length of the wire connecting the two lateral mouths (e.g. the mouths of the cavities 20 and 14) near the mentioned series of cavities has been reduced to the mentioned value ("v"), which is slightly exceeding the distance between the internal mouths of the two cavities (See the previous phase 8).

The previously shown phases may be subject to integrations and variants.

DETAILED DESCRIPTION OF THE INVENTION

One integration could regard phase 5. The wire used for realizing the partial winding may in fact be a continuous wire originating from a feeding spool. In this case, after arresting the dragging motion of the wire provided in phase 5, there could in addition to the action of the mentioned third clamp 7 also be the action of a known peeling system (meaning an insulating surface layer removal system) of a length of the wire entering the first carrier 4, and thus the action of a clipper 9 (See FIG. 9) effecting the cut-off of the wire at the central point of the peeled length so as to make available a new tip of the wire originating from the feeding spool, useful for an eventual new partial winding.

One variant could regard the action of reversing the direction of the tip of the wire exiting a cavity. Such a reversal could in fact, instead of occurring during the mentioned phase 3, be delayed up to the end of phase 6.

The previously described realization example of a partial winding has in fact concerned the introduction of only one wire into each cavity of the series of cavities 14, . . . 7. However, the process according to the invention is also suitable for realizing windings at multiple levels (see the example in FIG. 5, which shows the presence of six-level turns in each cavity). In order to achieve multiple level windings in the cavities, the present invention provides that after realizing the windings at one level, the stations 3 and 3' are raised to the height of the subsequent level, so as to enable initializing new windings.

It can further be observed that the process according to the invention, applied in the example to the orderly series of cavities 14, . . . ,7, can be applied to any other orderly series of cavities, including series arranged with repetition, such as for instance, with reference to the cavities of FIG. 6, a series of the type 1, 2, 1, 2, etc.

The invention claimed is:
1. Manufacturing process for stator and/or rotor windings of an electric motor including a number of cavities distributed along a cylindrical internal surface of the stator and/or a cylindrical external surface of the rotor, respectively, each having a first lateral mouth provided on a first side (A) of the stator and/or the rotor, respectively, a second lateral mouth provided on an opposite side (B) of the stator and/or of the rotor, respectively, and an internal mouth provided on the cylindrical internal surface of the stator and/or along the cylindrical external surface of the rotor, respectively, and further including:
   A supporting shaft (2) for the stator (1) and/or the rotor, respectively, capable of rotating around its axis, which happens to coincide with the axis of the cylindrical internal surface of the supported stator and/or the axis of the cylindrical external surface of the supported rotor, respectively;
   A first (3) and a second (3') working station respectively allocated on a position opposite to the sides (A, B) of the stator and/or the rotor, respectively, next to the outlet area of one of the first and second lateral mouths, respectively,
   A first (4) and a second (4') carriers, allocated on the first and the second working station, respectively, used for sliding and dragging the wire (f) destined to form the windings in an opposite cavity at the moment processed, A first (5) and a second (5') clamp, present on the first and the second working station, respectively, capable of grasping and moving the tip of the wire (f) of the winding in processing phase, A first (6) and a second (6') sensor, present on the first and the second working station, respectively, capable of detecting arrival of the extremity of the wire (f) that has crossed a cavity in a processing phase, and comprising the following processing phases aimed at obtaining the progressive passing of the wire in an alternate direction and subsequently, within an established orderly series of cavities:

1. Positioning of the shaft (2) so as to bring a lateral mouth of a first cavity of the series of cavities into a position opposite the first and second carriers (4, 4');
2. Introducing the tip of the wire, by the first clamp (5), into a first carrier (4) and subsequently introducing the tip, by the action of the first carrier, into the first lateral mouth of the first cavity, and its sliding the wire within the first cavity and exiting from a second lateral mouth, until the wire has passed through the second carrier (4') and is detected by the second sensor (6');
3. Actuating the second clamp (5'), which after grasping the wire next to its tip moves a certain distance in the forward direction of the wire and rotates its tip until orienting it into an opposite direction, either in this phase or in one of the phase 4, 5 and 6 outlined below;
4. Continuing the exit of the wire from the second lateral mouth, until the length of the exited wire has reached a value adequate for completing the passing of the wire into the mentioned series of cavities;
5. Arresting the dragging action of the first (4) and the second (4') carrier and starting the action of a third clamp (7) in the first working station, which blocks the tail of the wire near the first lateral mouth of the first cavity of the series of cavities;
6. Disengaging the wire from the first and second carrier and rotating the shaft (2), together with the mentioned third clamp (7), until the lateral mouths of the second cavity of the mentioned series of cavities are brought to a position opposite the mentioned carriers;
7. Repeating the previous processing phases 2 and 3, while interpreting the same substituting the terms "first clamp (5)", "first carrier (4)", "first mouth of the first cavity", "second mouth", "second carrier (4')" and "second sensor (6')", with the terms "second clamp (5')", "second carrier (4')", "second mouth of the second cavity", "first mouth", "first carrier (4)" and "first sensor (6)", respectively;
8. Continuing the exit of the wire from the first lateral mouth of the second cavity of the mentioned series of cavities, until the wire has disengaged from the second carrier and the length of the wire connecting the second lateral mouth of the first cavity of the series of cavities to the second lateral mouth of the second cavity has been reduced by a certain value slightly exceeding the distance between the internal mouths of the first and second cavities;
9. Disengaging the wire from the first carrier and rotating the shaft (2) until the lateral mouths of a third cavity of the series of cavities are brought to a position opposite the first and second carriers;
10. Repeating, mutatis mutandis, the previous operations from 7 to 9 for all the remaining cavities of the series of cavities, until the tip of the wire exits from one of the lateral mouths of the last cavity of the series of cavities.

2. Manufacturing process as in claim 1, wherein the mentioned carrying devices (4, 4') are each realized by using a pair of adjacent rollers rotating in an opposite sense to each other, whose cylindrical surface is fitted with a central groove capable of better holding the leading wire during its dragging motion.

3. Manufacturing process as in claim 1, further including a device (8) equipped with a proximity sensor (11) and a roller capable of easing the introduction of the wire into the cavity in the terminal phase of such an introduction, device which is introduced between the lateral surface of the stator and the wire in order to detect when the length of the wire connecting the two near lateral mouths of the mentioned series of cavities has been reduced to the mentioned established value ("v") slightly exceeding the distance between the internal mouths of the two cavities.

4. Manufacturing process as in claim 1, wherein the portion (2') of the shaft (2) directly supporting the stator carries on its cylindrical surface a series of ribs (n), each capable of introducing itself into the internal mouth of each cavity.

5. Manufacturing process as in claim 4, wherein the mentioned portion (2') of the shaft (2) has a fillet (j) running circularly along the lateral mouth of the cavities, capable of preventing the insulating sheet normally present on the walls of the cavities from falling out during the introduction of the wire.

6. Manufacturing process as in claim 5, wherein the wire used for realizing the partial winding is a continuous wire originating from a feeding spool, and that after arresting the dragging of the wire provided in the mentioned phase 5, there is also an action of a known peeling method, peeling a length of the wire entering the first carrier (4), followed by the action of a cutter (9) effecting a cut of the wire at a central point of the peeled length, so as to make available a new tip of the wire originating from the feeding spool, which may be used for an eventual new winding.

7. Manufacturing process as in claim 5, in order to achieve windings at multiple levels in the cavities, the stations 3 and 3' are, once the windings have been realized at one level, raised up to the height of the subsequent level, so as to enable them to initiate new windings.

\* \* \* \* \*